United States Patent
Alghamdi et al.

(10) Patent No.: US 11,542,812 B2
(45) Date of Patent: Jan. 3, 2023

(54) IN-LINE MONITORING OF ZETA POTENTIAL MEASUREMENTS

(71) Applicant: Saudi Arabian Oil Company, Dhahran (SA)

(72) Inventors: Amani Othman Alghamdi, Dhahran (SA); Mohammed Badri Al-Otaibi, Dhahran (SA); Subhash Chandrabose Ayirala, Dhahran (SA); Ali Abdallah Al-Yousef, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 395 days.

(21) Appl. No.: 16/889,393

(22) Filed: Jun. 1, 2020

(65) Prior Publication Data

US 2021/0372275 A1    Dec. 2, 2021

(51) Int. Cl.
  *G01N 27/60* (2006.01)
  *E21B 47/13* (2012.01)
  (Continued)

(52) U.S. Cl.
  CPC ............ *E21B 47/13* (2020.05); *E21B 47/003* (2020.05); *E21B 49/0875* (2020.05); *G01N 27/60* (2013.01); *G01S 19/072* (2019.08)

(58) Field of Classification Search
  CPC ...... G01S 19/072; E21B 47/13; E21B 47/003; E21B 49/0875; E21B 49/08;
  (Continued)

(56) References Cited

U.S. PATENT DOCUMENTS

| 6,939,719 B2* | 9/2005 | Chun ................ B01D 65/10 |
| | | 73/61.73 |
| 7,028,711 B1 | 4/2006 | Scott |

(Continued)

FOREIGN PATENT DOCUMENTS

| DE | 101 54 790 A1 | 5/2003 |
| WO | WO-2021/245450 | 12/2021 |

OTHER PUBLICATIONS

Alroudhan, A. et al., Zeta potential of intact natural limestone: impact of potential-determining ions Ca, Mg and SO4, Colloids and Surfaces A: Physicochemical and Engineering Aspects, 493:83-98 (2016).

(Continued)

*Primary Examiner* — Jermele M Hollington
*Assistant Examiner* — Taqi R Nasir
(74) *Attorney, Agent, or Firm* — Osha Bergman Watanabe & Burton LLP (57) ABSTRACT

Methods and systems are provided for measuring the zeta potential of macroscopic solid surfaces including and not limited to: porous samples, flat substrates, coarse particles, and granular samples. Methods include: subjecting the sample to an injection of a first aqueous solution at an initial pressure with an initial ion concentration; measuring a first electrical conductivity and a first temperature of the first aqueous solution; measuring a first pH and a second pH of the first aqueous solution immediately before and after passing the first aqueous solution through the sample; measuring a first ion concentration and a second ion concentration of the first aqueous solution immediately before and after passing the first aqueous solution through the sample; and processing the measured data to derive a first zeta potential from the first electrical conductivity and the first temperature.

30 Claims, 2 Drawing Sheets

(51) Int. Cl.
*G01S 19/07* (2010.01)
*E21B 47/003* (2012.01)
*E21B 49/08* (2006.01)

(58) Field of Classification Search
CPC .. E21B 2049/085; G01N 27/60; G01N 24/10; G01R 33/543; G01R 33/5608; G01R 33/4828; G01R 33/3415; G01R 33/283; G01R 33/307; G01R 33/60; G01V 3/32
See application file for complete search history.

(56) References Cited

U.S. PATENT DOCUMENTS

| | | | |
|---|---|---|---|
| 8,302,687 B2 | 11/2012 | Chen et al. | |
| 10,000,687 B2 | 6/2018 | Al-Yousef et al. | |
| 10,429,372 B2 | 10/2019 | Al-Yousef et al. | |
| 2011/0112815 A1* | 5/2011 | Stukan | E21B 43/16 703/10 |
| 2014/0253116 A1* | 9/2014 | Freedman | G01R 33/305 324/309 |
| 2018/0259499 A1* | 9/2018 | Al-Yousef | E21B 43/20 |

OTHER PUBLICATIONS

Ayirala, S.C. et al., Effect of salinity and water ions on electrokinetic interactions in carbonate reservoir cores at elevated temperatures, SPE Reservoir Eval. Engin., 21.03:733-746 (2018).
Choi, Y.S. et al., Determination of oceanic carbon dioxide using a carbonate-selective electrode, Anal. Chem., 74.1:2435-2440 (2002).
De Beer, D. et al., A microsensor for carbonate ions suitable for microprofiling in freshwater and saline environments, Limnology and Oceanography: Methods, 6.1:532-541 (2008).
Delgado, A.V. et al., Measurement and interpretation of electrokinetic phenomena, Jrnl. Coll. Inter. Sci., 309(2):194-224 (2007).
Electro-Chemical Devices, Calcium Sensor: S80 Calcium Sensors—the ECD Advantage, <https://ecdi.com/portfolio-item/calcium-sensor/>. Retrieved Nov. 26, 2019.
Gross, D. and Wendell, W.S. et al., Streaming potential and the electromechanical response of physiologically-moist bone, Jrnl. Biomech., 15.4:277-295 (1982).
Heberling, F. et al., Structure and reactivity of the calcite-water interface, Jrnl. Coll. Inter. Sci., 354(2):843-857 (2011).
Jackson, M.D. et al., Zeta potential in oil-water-carbonate systems and its impact on oil recovery during controlled salinity water-flooding, Sci. Repo., 1-12 (2016).
Lee, H.J. et al., Potentiometric evaluation of solvent polymeric carbonate-selective membranes based on molecular tweezer-type neutral carriers, Anal. Chem., 72.19:4694-4699 (2000).
Meyerhoff, M.E. et al., Role of trifluoroacetophenone solvents and quaternary ammonium salts in carbonate-selective liquid membrane electrodes, Anal. Chem., 59.1:144-150 (1987).
Otter, M. et al., Streaming potentials in chemically modified bone, Jrnl. Ortho. Res., 6.3:346-359 (1988).
Pokrovsky, O.S. et al., Dissolution kinetics of calcite, dolomite and magnesite at 25 C and Oto 50 atm pCO2, Chem. Geo., 217(3-4):239-255 (2005).
Alotaibi, M. B. et al., Dynamic interactions of inorganic species at carbonate/brine interfaces: An electrokinetic study, Coll. Surf. Phys. Engin. Aspec., 550:222-235 (2018).
Collini, H. et al., Zeta potential in intact carbonates at reservoir conditions and its impact on oil recovery during controlled salinity waterflooding, Fuel, 266, 16 pages (2020).
Esmaeili, S. et al., Investigation of streaming potential coupling coefficients and zeta potential at low and high salinity conditions: Experimental and modeling approaches, Jrnl. Petro. Sci. Engin., 145:137-147 (2016).
International Search Report for PCT/IB2020/056629, 5 pages (dated Feb. 15, 2021).
Jackson, M.D. et al., Supplementary Information for Zeta potential in oil-water-carbonate systems and its impact on oil recovery during controlled salinity water-flooding, Sci. Repo., 10 pages (2016).
Jackson, M.D. et al., Zeta potential in oil-water-carbonate systems and its impact on oil recovery during controlled salinity water-flooding, Sci. Repo., 13 pages (2016).
Vinogradov, J. et al., Measurement of streaming potential coupling coefficient in sandstones saturated with natural and artificial brines at high salinity, Jrnl. Geophys. Res., 115, 18 pages (2010).
Written Opinion for PCT/IB2020/056629, 9 pages (dated Feb. 15, 2021).

* cited by examiner

IN-LINE MONITORING OF ZETA POTENTIAL MEASUREMENTS

TECHNICAL FIELD

This application relates to methods of measuring zeta potential in porous media.

BACKGROUND

Streaming potential is the voltage difference (ΔV) that arises when a liquid is forced to flow through a porous media by a pressure gradient. When a solid surface is contacted with a liquid medium, a charge forms on the surface, inducing a surface potential, which is balanced by an equal and opposite charge in the liquid medium. An electrical double layer is formed in which two parallel layers of charge surround a surface—a stationary layer formed on the surface and a diffuse layer of ions attracted to the charged stationary layer. The electrical double layer exists within a slipping plane, where liquid between a surface and slipping plane moves tangentially along the surface, and liquid beyond the slipping plane moves within the surrounding liquid. The electric potential at the slipping plane region is referred to as the zeta (ζ-) potential.

The ζ-potential is calculated from the slope of the streaming potential (E) versus pressure (P) using the classical Helmholtz-Smoluchowski formula:

$$\zeta = \frac{\lambda \eta E}{\varepsilon P}$$

where $\varepsilon$ is the permittivity, $\lambda$ is the electrical conductivity, and $\eta$ is the viscosity of the solution. Thus, for a given material, the permittivity $\varepsilon$, electrical conductivity $\lambda$, and viscosity $\eta$ are all known constants resulting in the zeta potential $\zeta$ being proportional to the ratio of the streaming potential (E) and the differential pressure (P) across the porous media.

Streaming potential measurements are applied in fields ranging from geology to medicine. For example, in the medical field, streaming potential measurements may be used to study bone growth, repair, and remodeling. Streaming potential measurements may also be applied in the oil and gas industry to evaluate subterranean formations and aid in development of improved methods of enhanced oil recovery.

Current methods of measuring ζ-potential of calcium carbonate solutions are obtained using a system in which the solid and the liquid are in equilibrium. While ζ-potential measurements are performed in closed systems, effluent samples are commonly collected in an environment open to atmosphere. Such practice underestimates the impact of $CO_2$ dissolution on correctly evaluating processes that take place at a gas-liquid interface, as $CO_2$ dissolution directly affects pH and ion concentration ($Ca^{2+}$ and $CO_3^{2-}$) of a liquid solution, which are metrics used to derive the ζ-potential.

SUMMARY

The present disclosed embodiments include systems and methods for improved streaming potential measurements, which may be used to compute zeta potential, which in turn may be used to enhance oil recovery techniques due to the usefulness of zeta potential in determining the stability of oil and gas formations from a physical chemistry standpoint.

In one aspect, the present invention is directed to a system for determining a zeta potential of a porous medium, flat substrates, coarse particles, and/or granular samples including: fluid in fluid communication with both a first end and a second end of the porous medium; a first pressure sensor disposed upstream of the first end of the porous medium; a second pressure sensor disposed downstream of a second end of the porous medium, the first pressure sensor and the second pressure sensor collectively measuring a first pressure differential between an upstream and a downstream pressure of the fluid; a first probe disposed at the first end of the porous medium, the first probe measuring an upstream electrical characteristic of the fluid; and a second probe disposed at the second end of the porous medium, the second probe measuring a downstream electrical characteristic of the fluid, the first probe and the second probe collectively measuring a difference between the upstream and downstream electrical characteristic of the fluid. The zeta potential is determined based at least partially on a ratio of the first pressure differential between the upstream and downstream pressure of the fluid to the difference between the upstream and downstream electrical characteristic of the fluid.

In some embodiments, the electrical characteristic includes an electrical conductivity and/or a voltage.

In some embodiments, the fluid includes an aqueous solution.

In some embodiments, the system includes an inlet line fluidly coupled to the first end of the porous medium; and an outlet line fluidly coupled to the second end of the porous medium. The first pressure sensor is disposed in the inlet line, and the second pressure sensor is disposed in the outlet line.

In some embodiments, the system includes a first reservoir fluidly coupled upstream of the inlet line; and a second reservoir fluidly coupled downstream of the outlet line. A first pressure gradient between the first reservoir and the second reservoir drives the fluid through the porous medium.

In some embodiments, the system includes a first valve disposed in the inlet line; and a second valve disposed in the outlet line.

In some embodiments, the system includes a core holder for holding the porous medium.

In some embodiments, the system includes at least one temperature probe disposed the inlet line and/or the outlet line.

In some embodiments, the system includes at least one pH sensor disposed in the inlet line and/or the outlet line.

In some embodiments, the system includes at least one ionic sensor disposed in the inlet line and/or the outlet line.

In some embodiments, the ionic sensor includes at least one ionophore.

In some embodiments, the system includes a pressure source fluidly coupled to the first reservoir and/or the second reservoir; and a pressure regulator operatively coupled to the pressure source.

In some embodiments, the system includes a data acquisition system communicatively coupled to the first pressure sensor and the second pressure sensor; and a computer system communicatively coupled to the data acquisition system.

In some embodiments, the porous medium includes a core sample from a geologic formation.

In some embodiments, the porous medium includes a fluid-filled bone.

In some embodiments, the system includes a vent disposed in the first reservoir and/or the second reservoir. The fluid includes saline water, the porous medium includes carbonate, and each of the first pressure sensor and the second pressure sensor are calibrated to operate within a pressure range from about 0 bar to about 10 bar.

In another aspect, the present invention is directed to a method of measuring the zeta potential of a porous sample including: subjecting the porous sample to an injection of a first aqueous solution at an initial pressure with an initial ion concentration; measuring a first electrical conductivity and a first temperature of the first aqueous solution; measuring a first pH and a second pH of the first aqueous solution immediately before and after passing the first aqueous solution through the porous sample; measuring a first ion concentration and a second ion concentration of the first aqueous solution immediately before and after passing the first aqueous solution through the porous sample; and using the first pH, second pH, first ion concentration, and second ion concentration to derive a first zeta potential for the porous sample from the first electrical conductivity and the first temperature.

In some embodiments, subjecting the porous sample to an injection of the first aqueous solution includes subjecting the porous sample to an injection of the first aqueous solution without having exposed the aqueous solution to external environmental conditions.

In another aspect, the present invention is directed to a method of determining the zeta potential of a porous medium including: passing a fluid through the porous medium in a forward direction from a first end of the porous medium to a second end; measuring at least one electrical characteristic within the fluid at the first end of the porous medium; measuring at least one electrical characteristic within the fluid at the second end of the porous medium; measuring a pressure gradient of the fluid between the first end of the porous medium and the second end of the porous medium; and determining a first zeta potential based at least partially on a ratio of the pressure gradient to the difference between the electrical characteristic at the first end of the porous medium and the second end of the porous medium.

In some embodiments, the electrical characteristic includes an electrical conductivity and/or a voltage.

In some embodiments, the method includes passing the fluid through the porous medium in a reverse direction from the second end of the porous medium to the first end.

In some embodiments, the method includes determining a second zeta potential based at least partially on measurement of a pressure gradient of the fluid between the second end of the porous medium and the first end of the porous medium and measurement of a difference between at least one electrical characteristic at the second end of the porous medium and the first end of the porous medium when passing the fluid through the porous medium in the reverse direction.

In some embodiments, the method includes establishing a first pressure gradient across the porous medium prior to passing the fluid through the porous medium in the forward direction.

In some embodiments, the method includes establishing a second pressure gradient across the porous medium; and passing the fluid through the porous medium in a reverse direction.

In some embodiments, the second pressure gradient is opposite but otherwise approximately identical in magnitude to the first pressure gradient.

In some embodiments, the method includes establishing a third pressure gradient across the porous medium, the third pressure gradient being of a different magnitude than the first pressure gradient; and passing the fluid through the porous medium a second time in the forward direction.

In some embodiments, the method includes establishing a fourth pressure gradient across the porous medium; and passing the fluid through the porous medium a second time in the reverse direction.

In some embodiments, the fourth pressure gradient is opposite but otherwise approximately identical in magnitude to the third pressure gradient.

In some embodiments, the porous medium includes a rock matrix of a subterranean formation including a hydrocarbon reservoir.

In some embodiments, the electrical characteristic includes an electrical conductivity and/or a voltage.

It should be understood that the order of steps or order for performing certain actions is immaterial as long as a described method remains operable. Moreover, two or more steps or actions may be conducted simultaneously.

The following description is for illustration and exemplification of the disclosure only, and is not intended to limit the disclosure to the specific embodiments described.

The mention herein of any publication, for example, in the Background section, is not an admission that the publication serves as prior art with respect to any of the present claims. The Background section is presented for purposes of clarity and is not meant as a description of prior art with respect to any claim.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention and are not intended as a definition of the limits of the invention. For purposes of clarity, not every component may be labeled in every drawing. In the following description, various embodiments of the present invention are described with reference to the following drawings, in which.

DETAILED DESCRIPTION

It is contemplated that systems, devices, methods, and processes of the present application encompass variations and adaptations developed using information from embodiments described in the following description. Adaptation and/or modification of the methods and processes described herein may be performed by those of ordinary skill in the relevant art.

Throughout the description, where devices and systems are described as having, including, or comprising specific components, or where processes and methods are described as having, including, or comprising specific steps, it is contemplated that, additionally, there are devices and systems of the present application that consist essentially of, or consist of, recited components, and that there are processes and methods according to the present application that consist essentially of, or consist of, recited processing steps.

It should be understood that the order of steps or order for performing certain actions is immaterial so long as a described method remains operable. Moreover, in some embodiments, two or more steps or actions are conducted simultaneously.

Headers are provided for convenience of the reader and are not intended to be limiting with respect to claimed subject matter.

The present disclosed embodiments include devices, systems, methods, and processes for accurately determining zeta potential, which may be used for enhanced hydrocarbon recovery. One manner of enhanced hydrocarbon recovery is water flooding, where an aqueous solution is injected into a reservoir formation to displace residual oil (and/or other hydrocarbons). For example, in certain instances, a water flooding method includes injection of a brine solution, injection of a carbonated water solution, and/or injection of a carbonated saline solution. In certain instances, an aqueous injection solution may include calcium carbonate.

An equilibrium state of a calcium carbonate suspension depends on the partial pressure of $CO_2$ in surrounding air. As dissolution of $CO_2$ in an aqueous solution (such as a brine) increases, pH decreases due to formation of carbonic acid species. When brine is in contact with calcite, such as in subterranean carbonate (or other geologic) formations, in the presence of atmospheric $CO_2$, most carbonate ions in a suspension are present as bicarbonate at equilibrium. Consequently, at equilibrium, aqueous concentration of carbonate and carbonic acid is minimized and concentration of bicarbonate is maximized. The pH of brine will initially increase rapidly as $OH^-$ and $CO_3^{2-}$ concentrations increase, then decrease as equilibrium is reached, at which point most of the $OH^-$ has reacted with $CO_2$ to form bicarbonate. A resultant increase in mineral dissolution rate will yield an increase in calcium concentration of the solution, affecting the sign and magnitude of the zeta potential.

Additionally, dissolution of atmospheric $CO_2$ leads to variation in activity of $H_2CO_3^*$ ($H_2CO_3^* = H_2CO_3° - F - CO_2(aq)$), $HCO_3^-$, and $CO_3^{2-}$ in calcite-brine solutions near equilibrium, leading to a slow exchange of $CO_2$ between dissolved and gaseous states at basic pH, due to the formation of inactive $H_2CO_3^*$ species. Consequently, buffering of carbonate species formed during calcite dissolution is especially challenged in multi-phase measurements at high pH.

Encompassed in the present embodiments is the recognition that in-line monitoring of pH and concentration of key ions of a brine solution before and after applying hydraulic pressure enforcement in streaming potential measurements increases the accuracy of zeta potential determination. A pH at which the charge of a solid surface reverses, also known as an isoelectric point (IEP), is a fundamental parameter in determination of zeta potential. Variation in concentration of $Ca^{2+}$ and $CO_3^{2-}$ due to surface dissolution/adsorption/complexation that accompanies $CO_2$ dissolution can modify the structure of an electrical double layer, and consequently alter measured potential. The ability to monitor pH and ion concentrations in-line yields reliable streaming potential measurements. Improving accuracy of streaming potential measurements in subterranean formations, for example, will consequently improve optimization of enhanced oil recovery techniques.

In subterranean formations treated by water flooding, an electrical double layer occurs at the interface between the formation rock matrix and water within formation pores, with a negative charge coating surface of a rock matrix balanced by a positive charge of water filling matrix pore. As pressure is applied and water moves through a formation under a pressure gradient, an electrical current is generated, inducing a streaming potential.

Figure 1:
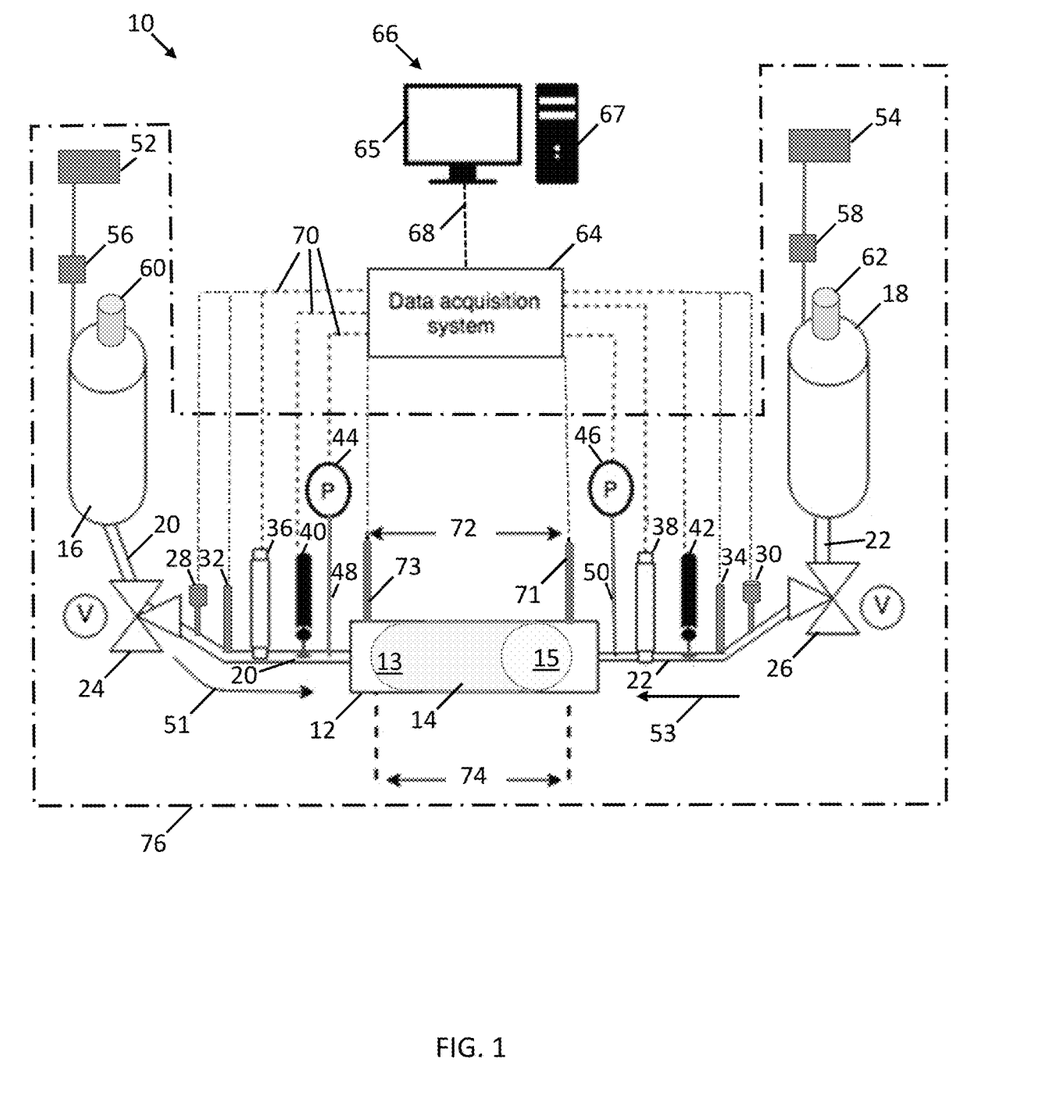
FIG. 1 is a pictorial representation of a system used for determining zeta potential, in accordance with aspects of the present embodiments.

FIG. 1 illustrates a system 10 for measuring zeta potential in a porous medium 14 (for example, a core sample such as a carbonate core with or without a saturation or aging in crude oil), according to aspects of the present embodiments. System 10 may include a core holder 12 disposed between a first reservoir 16 and a second reservoir 18, each for holding an aqueous solution. An inlet line 20 may fluidly connect the first reservoir 16 to the core holder 12 while an outlet line 22 may fluidly connect the core holder 12 to the second reservoir 18. The system may include first and second valves 24, 26 disposed in the inlet and outlet lines 20, 22 respectively. As such, the first reservoir 16 may be in fluid communication with the second reservoir 18 via the inlet line 20, the core holder 12 and/or porous medium 14, as well as via the outlet line 22, assuming both the first and second valves 24, 26 are in open positions. The core holder 12 may be used to hold a porous medium 14 including, but not limited to a core sample or a flat surface such as a mica/silica substrate, coarse particles of any known material, and granular samples (for example, from an oil and gas reservoir of a subterranean formation). Each of the inlet and outlet lines 20, 22 may include several probes, sensors and/or instruments disposed therein for sensing or measuring various characteristics of the aqueous solution flowing therethrough. For example, the inlet line 20 may include a first temperature probe 28, a first electrical conductivity probe 32, a first pH sensor 36, a first ionic sensor 40, and/or a first pressure sensor 44. Similarly, the outlet line 22 may include a second temperature probe 30, a second electrical conductivity probe 34, a second pH sensor 38, a second ionic sensor 42, and/or a second pressure sensor 46. The first and second pressure sensors 44, 46 may be fluidly coupled to the inlet and outlet lines 20, 22 with respective first and second sensing lines 48, 50.

Referring still to FIG. 1, each of the probes, sensors, and/or instruments 28, 30, 32, 34, 36, 38, 40, 42, 44, 46 may be communicatively coupled via one or more wired (for example via Ethernet or coaxial cable) or wireless couplings 70 with a data acquisition system 64, which may be used for collecting, processing, and storing measurement data from the sensors, and/or instruments 28, 30, 32, 34, 36, 38, 40, 42, 44, 46. The data acquisition system 64 may be communicatively coupled to a computer system 66 (for example, including at least one display 65 or user interface and at least one central processing unit (CPU) 67, as well as memory and other components) via a wired, wireless, and/or network connection 68. The computer system 66 may be used to interface with the data acquisition system 64 in connection with receiving measured data from the sensors, and also for controlling and adjusting the frequency at which data is collected, for data averaging and filtering, as well as for dictating how raw voltages and currents received from the sensors are converted into engineering units.

Still referring to FIG. 1, the first reservoir 16 may include a first closeable vent 60 disposed therein that may be used to selectively expose the interior of the first reservoir 16 to ambient (or atmospheric) conditions. Similarly, the second reservoir 18 may include a second closeable vent 62 disposed therein that may be used to selectively expose the interior of the second reservoir 18 to ambient (or atmospheric) conditions. Each of the first and second reservoirs 16, 18 may be fluidly coupled to respective first and second pressure sources 52, 54, which may include pumps and/or compressors for selectively providing pressure to the interior of the first and second reservoirs 16, 18. The system 10 may also include first and second pressure regulators 56, 58 fluidly coupled to each of the first and second pressure sources 52, 54 for selectively adjusting the respective pressures within the first and second reservoirs 16, 18 to a desired level. The first and second pressure sources 52, 54 and the first and second pressure regulators 56, 58 may be operatively coupled to the computer system 66 (either directly or via the data acquisition 64), or instead (or in addition) may be operatively coupled to a standalone control system (not shown). Each of the first and second pressure sources 52, 54, the first and second pressure regulators 56, 58, the computer system 66, the data acquisition system 64, the first and second vents 60, 62, the first and second valves 24, 26, and the sensors 28, 30, 32, 34, 36, 38, 40, 42, 44, 46 may be electrically coupled to at least one power supply (not shown). In one or more embodiments, the system 10 may include first and second reservoirs 16, 18 with adjustable heights that allow the aqueous solution to gravity feed through the system. As such, different pressure gradients 74 (both position and negative) can be established across the porous medium 14 based on the height of the first reservoir 16 relative to the second reservoir 18, and vice versa. In such systems, the first and second pressure sources 52, 54, and the first and second pressure regulators 56, 58 may not be required.

In operation, a porous medium 14 such as a core sample (for example, a carbonate core) may be placed in the core holder 12. In one embodiment, the core sample 14 may include one or more porous core plugs with dimensions ranging from about 1 inch to about 3 inches in diameter and from about 2 inches to about 12 inches in length. In other embodiments, the core sample 14 may be from about 1.5 inches to about 2.5 inches in diameter, or from about 0.5 inches to about 4 inches in diameter. In some embodiments, the core sample 14 may include a length from about 1 inch to about 18 inches, or from about 3 inches to about 15 inches, or from about 4 inches to about 10 inches, or from about 6 inches to about 8 inches. The first reservoir 16 may be filled with an aqueous solution (for example, an aqueous electrolyte such as saline water with a predetermined and/or selected ionic strength). The aqueous solution may then flow through the first valve 24 (in an open position) and the inlet to the core holder 12 and porous medium 14. A positive pressure in the first reservoir 16 drives the aqueous solution through the porous medium 14 (for example, a carbonate core) due to the second valve 26 also being open as well as the second reservoir 18 being exposed to atmosphere (for example, due do the second vent 62 being open). Stated otherwise, a higher pressure in the first reservoir 16 than the second reservoir 18 drives the aqueous solution through the porous medium 14. As the aqueous fluid flows in a forward direction 51 and passes the sensors 28, 30, 32, 34, 36, 38, 40, 42, 44, 46 disposed in the inlet and outlet lines characteristics of the aqueous fluid are measured both upstream of (that is, in the inlet line 20) and downstream of (that is, in the outlet line 22) the porous medium 14. For example, as the aqueous fluid passes through the inlet line 20, the temperature and pressure may be measured via the temperature probe 28 and pressure sensor 44. In addition, the electrical conductivity of the aqueous solution may be recorded by the electrical conductivity probe 32. The streaming potential 72 may be measured via a first electrode 73 disposed at an upstream end of the porous medium 14 (for example, at a first end 13 of the porous medium 14 adjacent the inlet line 20) and a second electrode 71 disposed at a downstream end of the porous medium 14 (for example, at a second end 15 of the porous medium 14 adjacent the outlet line 22), the upstream and downstream ends 13, 15 of the porous medium 14 being defined relative to a forward flow direction 51. Each of the first and second electrodes 71, 73 may be communicatively coupled to the data acquisition system 64. The streaming potential 72 and the pressure gradient 74 (and/or differential pressure 74 using the first and second pressure sensors 44, 46, upstream and downstream of the porous medium 14) may be used to determine the zeta potential (for example, using the Helmholtz-Smoluchowski formula above).

Referring still to FIG. 1, the first and second ionic sensors 40, 42 may be used to detect the concentration of ions such as $Ca^{+2}$ and $CO_3^{-2}$ in the aqueous solution both upstream of and downstream of the porous medium 14. Any difference in the concentration of $Ca^{+2}$ and $CO_3^{-2}$ between the upstream and downstream measurements (that is, at sensors 40 and 42) may be attributed to $CO_2$ dissolution in the aqueous solution, which may then be corrected for accordingly. Because the computed zeta potential is also highly dependent on the pH of the brine, small changes in the pH due to atmospheric $CO_2$ dissolution will affect the signal/magnitude of computed zeta potential and will increase the concentration of $Ca^{+2}$ due to mineral dissolution. To avoid such complications and to effectively monitor such changes, the system 10 includes the first and second sensors 36, 38 placed upstream and downstream of where the aqueous solution flows through the porous medium 14. Therefore, because both the pH and the $CO_2$ dissolution are being accounted for via independent measurements, any exposure of the aqueous solution to ambient or atmospheric conditions may be accounted for, thereby allowing a corrected and accurate zeta potential to be computed for the core sample 14 (for example, a carbonate core).

Still referring to FIG. 1, after the aqueous solution passes through the porous medium 14, the outlet line 22, and the second valve 26, and flows into the second reservoir 18, the first and second valves 24, 26 may each be closed, the first vent 60 may open, and the second vent 62 may close such that the pressure within the first reservoir 16 equalizes with atmospheric pressure, and the pressure within the second reservoir 18 may rise to a positive pressure (for example, the pressure of the first reservoir 16 prior to the aqueous solution flowing out of the first reservoir 16). The second pressure source 54 and the second pressure regulator 58 may be used to raise the pressure within the second reservoir 18. The first and second valves 24, 26 may then be opened such that a pressure gradient 74 is created between the second reservoir 18 and the first reservoir 16 (and across the porous medium 14), thereby forcing the aqueous fluid back through the outlet line 22, through the porous media 14 in a reverse direction 53, through the inlet line 20, and back into the first reservoir 16. Because the zeta potential is proportional to the ratio of the streaming potential 72 to the pressure gradient 74, and the pressure gradient 74 may be dependent on flow direction (for example, due to non-homogenous flow characteristics in the reverse flow direction 53 compared to the forward flow direction 51), a more accurate zeta potential may be achieved by assessing the zeta potential in both the forward and reverse flow directions 51, 53.

Referring still to FIG. 1, the process may then be repeated again and again with the aqueous solution flowing in the forward and reverse directions 51, 53 at higher and higher pressure gradients 74 to attain a representative zeta potential of the core sample 14. For example, the pressure sources 52, 54 pressure regulators 56, 58, valves 24, 26, and vents 60, 62 may all be operated such that higher and higher pressure gradients 74 are created between the first and second reservoirs 16, 18 and vice versa such that the aqueous solution is forced back and forth through the porous medium 14 (or core sample), while the sensors 28, 30, 32, 34, 36, 38, 40, 42, 44, 46 capture the respective upstream and downstream fluid measurements. Assessing the zeta potential across a range of pressure gradients 74 allows a core sample to be characterized at a variety of conditions corresponding to various flow conditions that may be present within a formation (for example, a geologic formation) during typical operating conditions (for example, when a well is operating within a formation). A pressure gradient 74 may be in a range of from about 0 bar to about 4 bar, and various sub-ranges therebetween.

Still referring to FIG. 1, the electrical conductivity probes 32, 34 may include a conductivity meter with a conductivity range of about zero (0) to about (20) mS.cm-1. The pH sensors 36, 38 may include various shapes and sizes to enable in-line monitoring with different mechanical options for installation. For example, in one embodiment, the pH sensors 36, 38 may be calibrated in a pH range from about 4.0 to about 7.5. In another embodiment, the pH sensors 36, 38 may be calibrated in a pH range from about 5.5 to about 8.5. In another embodiment, the pH sensors 36, 38 may be calibrated in a pH range from about 3.0 to about 9.5. In another embodiment, the pH sensors 36, 38 may be calibrated in a pH range from about 2.0 to about 12.5. Each pH sensor 36, 38 may be configured for multiple uses, or may be configured to be replaceable (that is, in the case of single-use sensors). Each pH sensor 36, 38 may also include a micro-sensor and/or a needle-type configuration and may include a silica-fiber with a thickness from about 100 μm (that is, microns or micrometers) to about 200 μm, or from about 110 μm to about 180 μm, or from about 120 μm to about 160 μm, or from about 130 μm to about 150 μm.

Referring still to FIG. 1, the ionic sensors 40, 42 may include carbonate selective sensors, including ionophores with enhanced selectivity in high salinity water, and/or an alternate ionophore with a similar molecular structure (that is, similar to that of the carbonate selective sensors but where two carbofluoro-groups are connected by a hydrophobic bridge, resulting in a structure that acts as molecular tweezers for a carbonate ion (for example, including, but not limited to N,N,-dioctyl-3α,12α-bis(4-trifluoroacetylbenzoxy)-5β-cholan-24-amide (TFAP-CA)). Including an ionophore in the ionic sensors 40, 42 may enable higher selectivity and may allow accurate determination of dissolved inorganic carbon (DIC) in seawater from the carbonate and pH measurements. The ionic sensors 40, 42 may also include microsensors with tip diameters in a range of from about 10 μm to about 15 μm, or from about 5 μm to about 20 μm, which may allow for high spatial resolution concentration measurements. The ionic sensors 40, 42 may also include an ionophore with one to three trifluoroacetobenzoyl (TFAB) groups per cholic acid derivative, which may include three hydroxyl groups linking to the C3, C7, and C12 positions of its rigid steroidal ring structure, and may be used for higher carbonate selectivity. The ionic sensors 40, 42 may also include selective electrodes used as microsensors fixed at both inlets (for example, at the first and second ends 13, 15 of the porous medium 14) of a streaming potential 72 instrumental setup or as a microsensor that is mounted on both inlets (that is, at or near the first and second ends 13, 15) by mechanical means. In some embodiments, the ionic sensors 40, 42 may include calcium selective electrodes including a sensing element made of a PVC membrane containing an ion exchanger and a double junction reference electrode, which operates by creating a millivolt potential proportional to the concentration of calcium ions in the measured aqueous solution or fluid.

Still referring to FIG. 1, each of the sensors 28, 30, 32, 34, 36, 38, 40, 42, 44, 46 may include a "T" configuration such that they intersect the inlet and/or outlet line 20, 22 at about a 90-degree angle (for example, from about 80 degrees to about 100 degrees, or from about 75 degrees to about 105 degrees). Each of the sensors 28, 30, 32, 34, 36, 38, 40, 42, 44, 46 allows the aqueous solution to pass by or there through, with little to no disturbance created in the flow of the aqueous solution. The sensors 28, 30, 32, 34, 36, 38, 40, 42, 44, 46 and associated taps and/or sensing lines may be connected to the inlet and/or outlet line 20, 22 via compression fit, quick-connect, threading, Luer locks, adhesion, flexible tubing (for example, using ring clamps), Fernco flexible couplings, as well as other suitable couplings. Each of the sensors 28, 30, 32, 34, 36, 38, 40, 42, 44, 46 may be pressure resistant through a pressure range, for example, of 0 bar to about 1 bar, about 3 bar, about 5 bar, about 7 bar, about 10 bar, and/or higher than about 10 bar. The system 10 may also include one or more oxygen ($O_2$) sensors (for example, integrated into one or more of the sensors 28, 30, 32, 34, 36, 38, 40, 42, 44, 46) in order to allow for corrections of the various sensor readings to a standardized level of oxygen in the aqueous solution. In some embodiments, the entire system 10 may be placed in a temperature-controlled environment 76, such as an oven, autoclave, or temperature-controlled room. The temperature within the temperature-controlled environment 76 may be adjusted to a range from about 40 degrees C. to about 100 degrees C., or from about 45 degrees C. to about 90 degrees C., as well as other appropriate ranges to simulate temperatures within a formation (or within a fluid filled bone in the case of medical applications). In some embodiments, the data acquisition system 66 and the computer system 66 are not placed within the temperature-controlled environment 76, and instead are operatively coupled with components within the temperature-controlled environment 76 via wireless connections and/or via wired connections that traverse the boundary of the temperature-controlled environment 76.

Figure 2:
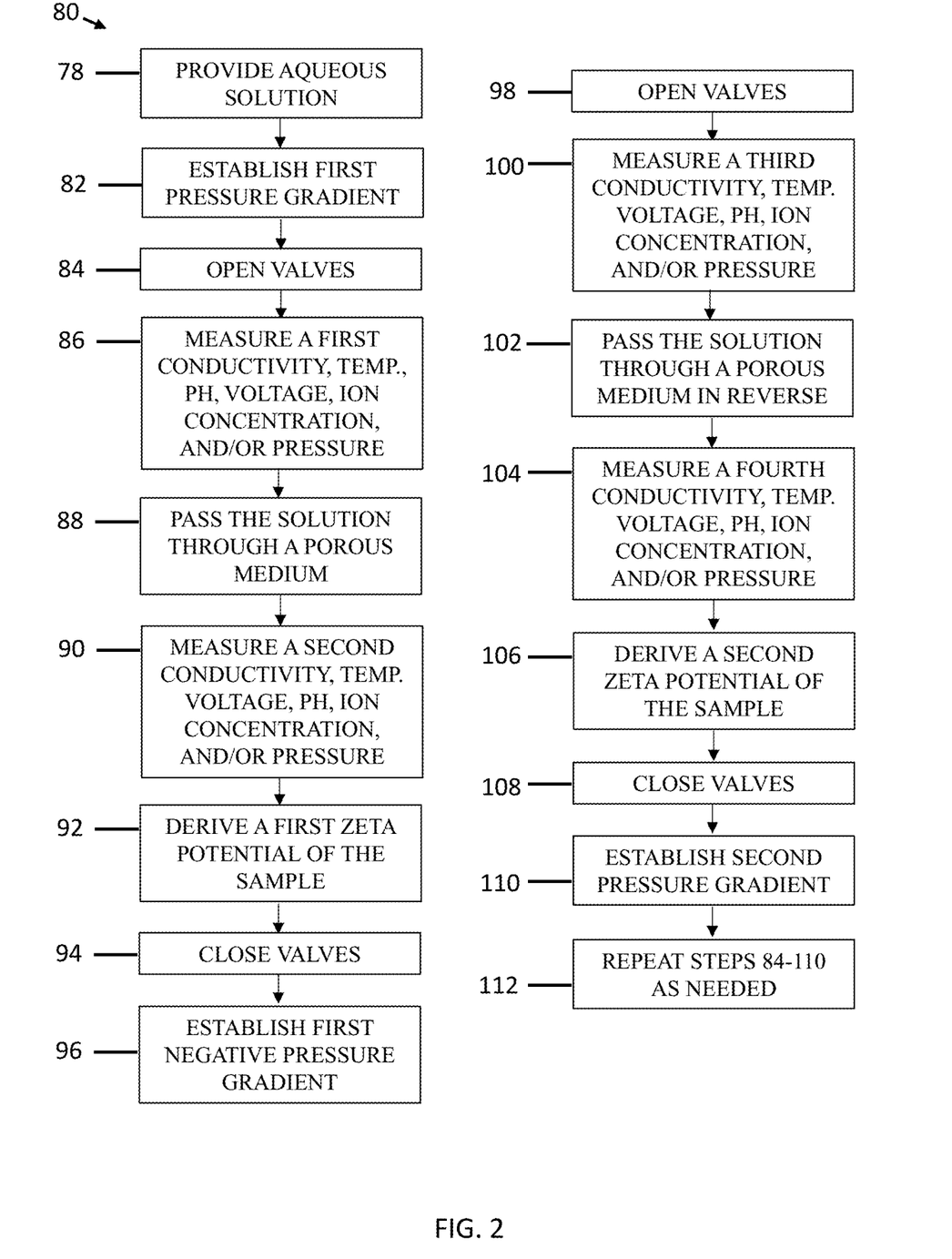
FIG. 2 illustrates a method of measuring zeta potential, according to aspects of the present embodiments.

FIG. 2 illustrates a method 80 of measuring the streaming potential 72 of a porous media 14, according to aspects of the present disclosed embodiments. At step 78, the method 80 may include providing an aqueous solution (for example, within the first reservoir 16). At step 82, the method 80 may include creating a first pressure gradient 74 (for example, a differential pressure between the first and second reservoirs 16, 18 such that the differential pressure is higher within the first reservoir 16 than the second reservoir 18). The differential pressure between the first and second reservoirs 16, 18 is enough to drive fluid flow through the inlet and outlet lines 20, 22 and to create the pressure gradient 74 across the porous medium 14. The differential pressure between the first and second reservoirs 16, 18 may be created via the first pressure source 52, the first pressure regulator 56, and the first vent 60 (which may be closed), while the second vent 62 is simultaneously in an open position. At step 84, the method 80 may include opening the first and second valves 24, 26, thereby allowing the aqueous solution to flow from the first reservoir 16 to the second reservoir 18. At step 86, the method 80 may include measuring a first conductivity, temperature, pH, voltage, ion concentration, and/or pressure of the aqueous solution as it flows in a forward direction 51 through the inlet line 20. At step 88, the method 80 may include passing (or flowing) the aqueous solution through the porous medium 14 (for example, a core sample held within the core holder 12). At step 90, the method 80 may include measuring a second conductivity, temperature, pH, ion concentration, and/or pressure of the aqueous solution as it flows in a forward direction 51 through the outlet line 22 (that is, after exiting the porous medium 14).

Referring still to FIG. 2, at step 92, the method 80 may include deriving a first zeta potential of the porous medium 14 based on the pressure gradient 74 across the porous medium 14 (measured using the first and second pressure sensors 44, 46), the streaming potential 72 (determined from the difference between first and second voltages, measured at the first and second electrodes 71, 73), and the Helmholtz-Smoluchowski relationship (since the permittivity r, electrical conductivity, and viscosity n of the porous medium 14 and/or aqueous solution are known based on the underlying materials). The calculated zeta potential may also be corrected based on the measured electrical conductivity, ion concentrations, pH, and temperature of the aqueous solution. At step 94, the method 80 may include closing both the first and second valves 24, 26 to stop the flow of the aqueous solution through the system 10. At step 96, the method 80 may include establishing a negative differential pressure between the first and second reservoirs 16, 18 (the negative differential pressure referring here to a higher pressure in the second reservoir 18 than in the first reservoir 16). The negative differential pressure may be established by opening the first vent 60 such that the pressure in the first reservoir 16 equalizes with atmosphere while closing the second vent 62 and increasing the pressure within the second reservoir 18 via the second pressure source 54 and the second pressure regulator 58. The negative differential pressure may be set such that it is of approximately the same in magnitude (for example, within 0.5%, 1%, 5%, 10%, and/or 20%) as the first pressure differential established during step 82 of the method 80.

Still referring to FIG. 2, at step 98 the method 80 may include opening the first and second valves, thereby allowing the aqueous solution to flow from the second reservoir 18 back to the first reservoir 16 (via the outlet line 22, the porous medium 14, and the inlet line 20). At step 100, the method 80 may include measuring a third conductivity, temperature, pH, voltage, ion concentration, and/or pressure of the aqueous solution as it flows in a reverse direction 53 through the outlet line 22. At step 102, the method 80 may include passing (or flowing) the aqueous solution through the porous medium 14 (for example, a core sample held within the core holder 12) in the reverse direction 53. At step 104, the method 80 may include measuring a fourth conductivity, temperature, pH, voltage, ion concentration, and/or pressure of the aqueous solution as it flows in a reverse direction 53 through the inlet line 20 (that is, after the aqueous solution flows through the porous medium 14 in the reverse direction 53). At step 106, the method 80 may include deriving a second zeta potential of the porous medium 14 based on the pressure gradient 74 across the porous medium 14 (measured using the first and second pressure sensors 44, 46), the streaming potential 72 (determined from the difference between first and second voltages, measured at the first and second electrodes 71, 73), and the Helmholtz-Smoluchowski relationship (since the permittivity $\varepsilon$, electrical conductivity $\lambda$, and viscosity $\eta$ of the porous medium 14 and/or aqueous solution are known based on the underlying materials), the second zeta potential being representative of the flow across the porous medium 14 in the reverse flow direction 53. At step 108, the method 80 may include closing the first and second valves 24, 26, thereby stopping the flow of aqueous solution between the second and first reservoirs 18, 16. At step 110, the method 80 may include establishing or creating a second pressure differential between the first and second reservoirs 16, 18, the second pressure differential being of a different magnitude than (for example, greater than or less than) the first pressure differential that was created at step 82 of the method 80. Steps 84-110 of the method 80 may then be repeated over and over again (for example, at higher and higher pressure differentials (and corresponding negative pressure differentials)) such that an overall zeta-potential characteristic may be established across a range of pressure gradients, and taking the flow of the aqueous solution through the porous medium 14 in both the forward and reverse directions 51, 53 into account.

Referring still to FIG. 2, the method 80 may include other steps not illustrated. In some embodiments, one or more of steps 78-112 may be omitted. In some embodiments, steps may occur in a different order than what is illustrated and/or concurrently with other steps. For example, deriving the zeta potential may occur at the computer system 66 concurrent with opening or closing the valves, or after opening or closing the valves. Each of the first and second vents 60, 62 may be spring-loaded and/or may include a gasket such that even when the vents 60, 62 are in an open position, pressure is released from the first and/or second reservoir 16, 18 (for example, whichever reservoir is currently receiving the aqueous solution) in a controlled and gradual fashion (that is, rather than having the pressure in the reservoir immediately equalize with atmosphere with the vent wide open). In some aspects of the present disclosed embodiments, the system 10 illustrated in FIG. 1 and the method 80 illustrated in FIG. 2 may include a subset of the sensors and sensor locations.

The present disclosure describes in-line monitoring of pH of an electrolyte using a modular process sensor, thereby preventing misleading interpretations due to $CO_2$ dissolution in brine, which shifts pH from the IEP and produces an unreliable measurement. In addition, in-line monitoring of $Ca^{+2}$ and $CO_3^{-2}$ concentrations before and after injection using an ion selective sensor, eliminates uncertainty in the measurement of rock dissolution rates under high temperature and streaming potential conditions. Real-time monitoring of $CaCO_3$ dissolution rate and calculation of total calcium and carbonate concentrations in a closed system eliminates complications caused by $CO_2$ exposure. By taking the pH, ionic concentrations, and other factors such as temperature (which can cause variation in both the permittivity and viscosity due to the inverse relationships of temperature with both permittivity and viscosity) and electrical conductivity into account, an accurate zeta potential can be determined, which is useful in assessing the stability of porous media such as a core sample 14. In addition, using the present disclosed methods and system, the streaming potential 72 (and thus the zeta potential) may be assessed in multiple flow directions to account for differences in pressure gradients and voltage differentials attributed to the direction of fluid flow through the porous medium 14.

The present disclosed system 10 for measuring zeta potential in a porous medium 14 directly measures the streaming potential (voltage difference across the porous medium 14) and pressure gradient (pressure drop across the porous medium 14). The other measurements may be approximated for a given material. The zeta-potential calculation may be improved by also measuring temperature, since both permittivity and viscosity can vary (inversely) with temperature. Measuring the electrical conductivity directly may also improve the zeta-potential calculation (that is, compared to assuming an electrical conductivity of the aqueous solution). Measuring both the pH and the ion concentration (or alternatively, measuring either individually) help to account for $CO_2$ adsorption/dissolution, thereby further improving the accuracy of the zeta-potential calculation.

EXEMPLARY EMBODIMENTS

In order that the application may be more fully understood, the following examples are set forth. It should be understood that these examples are for illustrative purposes only and are not to be construed as limiting in any manner.

Example 1

The following example illustrates a method and system for measuring streaming potential in porous materials to determine zeta potential. In this illustrative embodiment, zeta potential may be determined for carbonate core samples. In a typical experiment, the following steps may be performed:

- A (carbonate) core sample 14 is placed and adjusted in a core holder 12.
- A liquid aqueous electrolyte (for example, saline water) with certain iconic strength is injected into a core sample 14 from an accumulator (first reservoir 16) with a certain internal pressure, forced into a rock matrix (that is, the porous medium or core sample 14 from a geologic formation) and ejected into a second accumulator (second reservoir 18) which remains at or near atmospheric pressure. In this process, pressure difference between the two accumulators 16, 18 is the driving force for liquid to flow through the system 10.
- The valve positions of the first and second valve 24, 26 are adjusted to reverse direction of flow from the second reservoir 18 to the first reservoir 16.
- Liquid passes through at least one electrical conductivity probe 32, 34 (and or electrode 71, 73) as it moves between reservoirs 16, 18.
- Streaming potential 72 is measured for flow in both directions 51, 53 over a linearly increasing range of pressures.
- Streaming potential 72 measurements and associated parameters are modulated as follows:
  - A computer program (for example, used by the computer system 66 and/or the data acquisition system 64) is used to control the applied pressure, duration of pressure, and rate of increase of pressure.
  - The temperature of the system 10 is controlled by an oven 76 in which it operates.
  - At least one sensor 28, 30, 32, 34 measures electrical conductivity and temperature of the liquid, then computes zeta potential (calculated from the slope of streaming potential 72 versus pressure gradient 74 using the Helmholtz-Smoluchowski formula).
  - Graphs of streaming potential 72 and pressure gradient 74 over time may be used (for example, by the computer system 66 or data acquisition system 64) to monitor progress of the measurements.

Example 2

In another exemplary embodiment, the present disclosed methods 80 and systems 10 may be used to monitor calcium concentration before and after injection of electrolytes in a fluid filled bone. In the field of orthopedics, fluid filled bones possess piezoelectric properties which are responsible for the electrical signals generated when external forces are applied to bone. The bones may be extracted and placed within an analyzer (for example, system 10). Those stress-generated potentials may be studied using a streaming potential analyzer (for example, system 10) to address bone growth, repair, and remodeling. In this embodiment, the bone is the porous medium 14 and the fluid within the bone is the aqueous solution. The piezoelectric properties may be measured via the electrical conductivity probes 32, 34 and/or electrodes 71, 73 (for example, low voltage, low amperage (that is, 4-20 milliamp) micro-electrodes) which may be brought in contact with either end of the fluid-filled bone 14. The addition of $Ca^{+2}$ ions to the solutions may be associated with a reduction in the magnitude of the streaming potential 72 consistent with the assumption that $Ca^{+2}$ is specifically adsorbed. In-line monitoring of $Ca^{+2}$ concentration (for example, via the ionic sensor 40, 42) before and after injection will keep track of $Ca^{+2}$ level in the bone and allow for a high level of tissue engineering studies that target the stress-generated potential (SGP) in bones, which is dominated by streaming potential. Stated otherwise, using the present disclosed system 10 and methodologies 80, a more accurate determination of both the streaming potential 72 and the zeta potential may be made, thereby allowing for enhanced orthopedic patient treatments.

In another exemplary embodiment, a system 10 for determining zeta-potential in a hydrocarbon reservoir of a subterranean formation (for example, a geologic formation) may include pressure sensors 44, 46 positioned across a porous medium 14 (for example, a rock matrix of the hydrocarbon reservoir). The system 10 may include first and second electrodes 71, 73 positioned across the rock matrix 14, as well as a first pH sensor 36 and a first ionic sensor 40 positioned just prior to an entrance to the hydrocarbon reservoir through which a water flooding treatment flows. The water flooding treatment may include injecting an aqueous solution into the rock matrix 14. Voltage potential may be measured by the first and second electrode 71, 73. The system 10 may also include a second pH sensor 38 and a second ionic sensor 42 positioned within the subterranean formation at or near where the water flooding treatment exits the hydrocarbon reservoir.

Other Embodiments

Certain embodiments of the present application were described supra. It is, however, expressly noted that the application is not limited to those embodiments, but rather the intention is that additions and modifications to what was expressly described in the present disclosure are also included within the scope of the application. Moreover, it is to be understood that the features of the various embodiments described in the present disclosure were not mutually exclusive and can exist in various combinations and permutations, even if such combinations or permutations were not made express, without departing from the spirit and scope of the application. Therefore, the disclosure should not be limited to certain implementations, but rather should be limited only by the spirit and scope of the following claims.

What is claimed is:

1. A system for determining a zeta potential of a porous medium, flat substrates, coarse particles, and granular samples comprising:
   fluid in fluid communication with both a first end and a second end of the porous medium;
   a first pressure sensor disposed upstream of the first end of the porous medium;

a second pressure sensor disposed downstream of a second end of the porous medium, the first pressure sensor and the second pressure sensor collectively measuring a first pressure differential between an upstream and a downstream pressure of the fluid;

a first probe disposed at the first end of the porous medium, the first probe measuring an upstream electrical characteristic of the fluid; and a second probe disposed at the second end of the porous medium, the second probe measuring a downstream electrical characteristic of the fluid, the first probe and the second probe collectively measuring a difference between the upstream and downstream electrical characteristic of the fluid, wherein the zeta potential is determined based at least partially on a ratio of the first pressure differential between the upstream and downstream pressure of the fluid to the difference between the upstream and downstream electrical characteristic of the fluid.

2. The system of claim 1, wherein the electrical characteristic comprises at least one of an electrical conductivity and a voltage.

3. The system of claim 2, wherein the fluid comprises an aqueous solution.

4. The system of claim 1, further comprising:
an inlet line fluidly coupled to the first end of the porous medium; and
an outlet line fluidly coupled to the second end of the porous medium,
wherein the first pressure sensor is disposed in the inlet line, and
wherein the second pressure sensor is disposed in the outlet line.

5. The system of claim 4, further comprising:
a first reservoir fluidly coupled upstream of the inlet line; and
a second reservoir fluidly coupled downstream of the outlet line,
wherein a first pressure gradient between the first reservoir and the second reservoir drives the fluid through the porous medium.

6. The system of claim 4, further comprising:
a first valve disposed in the inlet line; and
a second valve disposed in the outlet line.

7. The system of claim 1, further comprising a core holder for holding the porous medium.

8. The system of claim 4, further comprising at least one temperature probe disposed in at least one of the inlet line and the outlet line.

9. The system of claim 4, further comprising at least one pH sensor disposed in at least one of the inlet line and the outlet line.

10. The system of claim 4, further comprising at least one ionic sensor disposed in at least one of the inlet line and the outlet line.

11. The system of claim 10, wherein the at least one ionic sensor comprises at least one ionophore.

12. The system of claim 5, further comprising:
a pressure source fluidly coupled to at least one of the first reservoir and the second reservoir; and
a pressure regulator operatively coupled to the pressure source.

13. The system of claim 1, further comprising:
a data acquisition system communicatively coupled to the first pressure sensor and the second pressure sensor; and a computer system communicatively coupled to the data acquisition system.

14. The system of claim 1, wherein the porous medium comprises a core sample from a geologic formation.

15. The system of claim 1, wherein the porous medium comprises a fluid-filled bone.

16. The system of claim 5, further comprising a vent disposed in at least one of the first reservoir and the second reservoir,
wherein the fluid comprises saline water,
wherein the porous medium comprises carbonate, and
wherein each of the first pressure sensor and the second pressure sensor are calibrated to operate within a pressure range from about 0 bar to about 10 bar.

17. A method of measuring the zeta potential of a porous sample comprising:
subjecting the porous sample to an injection of a first aqueous solution at an initial pressure with an initial ion concentration;
measuring a first electrical conductivity and a first temperature of the first aqueous solution;
measuring a first pH and a second pH of the first aqueous solution immediately before and after passing the first aqueous solution through the porous sample;
measuring a first ion concentration and a second ion concentration of the first aqueous solution immediately before and after passing the first aqueous solution through the porous sample; and
using the first pH, second pH, first ion concentration, and second ion concentration to derive a first zeta potential for the porous sample from the first electrical conductivity and the first temperature.

18. The method of claim 17, wherein subjecting the porous sample to an injection of the first aqueous solution further comprises subjecting the porous sample to an injection of the first aqueous solution without having exposed the aqueous solution to external environmental conditions.

19. A method of determining the zeta potential of a porous medium comprising:
passing a fluid through the porous medium in a forward direction from a first end of the porous medium to a second end;
measuring at least one electrical characteristic within the fluid at the first end of the porous medium;
measuring at least one electrical characteristic within the fluid at the second end of the porous medium;
measuring a pressure gradient of the fluid between the first end of the porous medium and the second end of the porous medium; and
determining a first zeta potential based at least partially on a ratio of the pressure gradient to the difference between the at least one electrical characteristic at the first end of the porous medium and the second end of the porous medium.

20. The method of claim 19, wherein the at least one electrical characteristic comprises at least one of an electrical conductivity and a voltage.

21. The method of claim 20, further comprising passing the fluid through the porous medium in a reverse direction from the second end of the porous medium to the first end.

22. The method of claim 21, further comprising determining a second zeta potential based at least partially on measurement of a pressure gradient of the fluid between the second end of the porous medium and the first end of the porous medium and measurement of a difference between at least one electrical characteristic at the second end of the porous medium and the first end of the porous medium when passing the fluid through the porous medium in the reverse direction.

23. The method of claim 19, further comprising establishing a first pressure gradient across the porous medium prior to passing the fluid through the porous medium in the forward direction.

24. The method of claim 23, further comprising:
establishing a second pressure gradient across the porous medium; and
passing the fluid through the porous medium in a reverse direction.

25. The method of claim 24, wherein the second pressure gradient is opposite but otherwise approximately identical in magnitude to the first pressure gradient.

26. The method of claim 24, further comprising:
establishing a third pressure gradient across the porous medium, the third pressure gradient being of a different magnitude than the first pressure gradient; and
passing the fluid through the porous medium a second time in the forward direction.

27. The method of claim 26, further comprising:
establishing a fourth pressure gradient across the porous medium; and
passing the fluid through the porous medium a second time in the reverse direction.

28. The method of claim 27, wherein the fourth pressure gradient is opposite but otherwise approximately identical in magnitude to the third pressure gradient.

29. The method of claim 19, wherein the porous medium comprises a rock matrix of a subterranean formation comprising a hydrocarbon reservoir.

30. The method of claim 19, wherein the at least one electrical characteristic an electrical conductivity and a voltage.

* * * * *